United States Patent [19]  [11] 4,087,371
Lowicki et al.  [45] May 2, 1978

[54] METHOD OF PREVENTING INCRUSTATION ON HEATED SURFACES, AND COMPOSITION FOR THE PRACTICE OF THE METHOD

[75] Inventors: Norbert Lowicki, Duisburg-Hamborn; Michael Sidillo, Ottweiler, Saar, both of Germany

[73] Assignee: Grillo-Werke Aktiengesellschaft, Germany

[21] Appl. No.: 492,755

[22] Filed: Jul. 29, 1974

Related U.S. Application Data

[63] Continuation-in-part of Ser. No. 315,983, Dec. 18, 1972, abandoned.

[51] Int. Cl.² ............................................. C02B 5/06
[52] U.S. Cl. ........................................ 252/180; 252/175; 252/181; 21/2.7 R; 210/54; 210/58
[58] Field of Search ............... 210/2.7 R; 252/175, 252/180, 181, 135; 21/58, 54 R

[56] References Cited

U.S. PATENT DOCUMENTS

| | | | |
|---|---|---|---|
| 2,046,242 | 6/1936 | Bertsch | 210/58 |
| 2,097,649 | 11/1937 | Solberg | 252/175 |
| 2,728,725 | 12/1955 | Gloor | 252/180 |
| 2,893,990 | 7/1959 | Hass | 252/135 |
| 3,188,289 | 6/1965 | Kahler et al. | 210/58 |
| 3,463,730 | 8/1969 | Booth et al. | 252/180 |
| 3,596,766 | 8/1971 | Johnston et al. | 210/58 |
| 3,723,334 | 3/1973 | Maures | 21/58 |
| 3,849,341 | 11/1974 | Lamberti | 252/180 |

Primary Examiner—Mayer Weinblatt
Attorney, Agent, or Firm—McGlew and Tuttle

[57] ABSTRACT

Method of preventing deposits of dissolved inorganic salts on heated surfaces, such as tubular heat exchangers, is carried out by adding a deposit-preventing agent to the water before contact with the heated surfaces. Compounds complexing with cations are combined with anionic substances which are capable of salt formation with complex bound cations to form additive compositions which are added to the water in the zone near the walls of vessels or tubular heat exchangers subject to deposit incrustation. Such compositions are formed from cation-complexing compounds comprising a mixture of sulfurous acid esters of di- and/or polysaccharides and carboxymethyl cellulose as cation-complexing compounds, which mixture is combined with anionic substances comprising sulfonated fat by alcohols and/or fatty acids in the weight ratio having a range of from about 80 parts by weight cation-complexing compound to about 20 parts by weight anionic substance to (2) about 95 parts by weight cation-complexing compound to about 5 parts by weight anionic substance, the preferred weight ratio being 85:15 to 90:10 of cation-complexing compound; anionic substance, respectively. These compositions are added to the water in amounts ranging from 10 to 60 milligrams per liter, preferably 20 to 30 milligrams per liter.

4 Claims, No Drawings

METHOD OF PREVENTING INCRUSTATION ON HEATED SURFACES, AND COMPOSITION FOR THE PRACTICE OF THE METHOD

CROSS-REFERENCE TO RELATED APPLICATION

This is a continuation-in-part application of Ser. No. 315,983 filed Dec. 18, 1972, now abandoned.

SUMMARY OF THE INVENTION

The invention relates primarily to a method of preventing incrustation on heated surfaces which are in contact with water containing dissolved inorganic salts (e.g. $CaSO_4$, $MgSO_4$, $Na_2SO_4$, $Na_2CO_3$, $Ca(HCO_3)_2$ and others). The invention relates in particular to a method of preventing incrustation in tubular heat exchangers whose tubes are traversed by the water as cooling water, wherein a deposit-preventing agent is added to the water before contact with the heated surfaces. The invention further relates to a combination substance which is especially suitable for carrying out the method according to the invention.

"Heated Surfaces" according to the invention means also, and in particular, those surfaces whose temperature lies above 100° C, where deposit incrustation is known by experience to be particularly frequent. "Tubular heat exchangers" means, in particular, the condensers common in power plant operation. It thus becomes clear at the same time that according to the invention, the heated surfaces may also be heated by a medium which, in turn, for process technical reasons, is cooled by the water, such as sea-water. The main fields of application of the invention are, on the one hand, this cooling with seawater as cooling water and, on the other, the so-called seawater evaporation.

BACKGROUND AND PRIOR ART

Methods of the kind described are known in many forms, just as substances for the practice of the known methods have been proposed in many forms, namely, as so-called boiler scale prevention agents of both inorganic and organic nature. The mechanism of all known methods or measures is based on binding the inorganic salts dissolved in the water which touches the heated surfaces by complex formation, thus to increase their solubility. It has been found, however, that the known measures do not work satisfactorily in practice. Usually, the use of the known boiler scale prevention agents fails, for the reason that they are not efficient enough in the temperature range above 100° C.

The problem underlying the invention is to develop a method of the kind described herein which works satisfactorily also at temperatures of over 100° C. Another object of the invention is to provide compositions and combination substances which are especially suited for the practice of the new method.

DESCRIPTION OF THE INVENTION

The invention concerns a method for the prevention of incrustation on heated surfaces (including, and preferably, those whose temperature lies above 100° C), which surfaces are in contact with water which contains dissolved, inorganic salts. In particular, for the prevention of incrustation on tubular heat exchangers whose tubes are traversed by the water, an anti-incrustation agent is added to the water before contact with the heated surface. The invention consists in (1) forming compounds complexing with cations which are then combined to form compositions or combination substances with anionic substances which are capable of salt formation with the complex-bound cations of said compounds, and (2) adding such compositions to the water in the zones near the walls of the heated vessel or tube surfaces where combination crystallites are formed which, surprisingly, do not accresce on the heated surfaces. "Combination crystallites" denotes the crystallites occurring according to the method of the invention by the salt formation of the anionic substances with the complex bound cations, which are crystallographically completely different than is the case without the effect of the composition (combination substance) according to the invention. The term "combination substance" was chosen to indicate that here in functional fusion, the cation-complexing compounds and the anionic substances lead to the following effect: the formation of combination crystallites which do not accresce and which are carried away as soon as they reach a size which exceeds, as it were, the laminar boundary layer of the water in contact with the heated vessel or tube surfaces, so that hydrodynamic forces can bring about their removal. In fact, it must always be taken as a basis for the practice of the invention that the water which comes in contact with the heated surfaces flows or can be caused to flow.

Specifically, there are several possibilities within the framework of the method of the invention. In a preferred form of execution of the present invention the cation complexing compounds are combined when the saturation concentration of the cations is exceeded within the region of the heated surfaces. This can be achieved without difficulties by operating with a mixture of sulfurous acid esters of hydrolized di- and/or poly-saccharides and carboxymethyl cellulose as cation complexing compounds and combining these with sulfonated fat by alcohols and/or fatty acids. Such a combination should generally be added to the water in quantities of about 10 to 60 milligram per liter, preferably about 20 to 30 milligram per liter.

The invention arises from the surprising discovery that the problem can hardly be coped with by addition of substances which lead to compounds of higher solubility. As has been indicated already, in the method of the invention, the salt-binding anionic component of the combination substance brings about the formation of a crystallographically completely different material than is formed without addition of the combination substance. This material already forms crystal seeds in the turbulence range of the swept tube and permits with increasing saturation in the zone near the wall the formation of defined crystallites which surprisingly do not tend to accresce directly on this surface. This intended process of precipitate or crystal formation is brought about by the described composition or combination substance and is controllable by proportioning the components thereof. With this knowledge of the relationships in practice, the correct proportion is found experimentally. The complexing effect of the combination substance should be great enough reliably to prevent oversaturation phenomena (as they result, in particular, from anhydrous $CaSO_4$ in the boundary layer of a heated tube wall). On the other hand, the complexing factor of the combination substance should not be so great as to delay the desired salt formation with the anionic component of the sulfonated fatty alcohols or fatty acids. This mechanism of action also proceeds without impairment in the temperature range above 100° C. The results according to the invention are consequently fully insured also at temperatures over 100° C and even up to 150° C.

The salt formation, which takes place in small measure already in the turbulence zone of the liquid flowing along the heated surface with seed formation, sets in more intensely when changing to the laminar limit layer. The crystal growth connected therewith is favored by the frictional forces within the liquid predominating in the laminar flow range. The crystalline precipitates of the hardness formers which are formed in this way are entrained by the flowing water and either pass in suspended form into the outflowing thickened salt solution or are removed by sludging devices, possibly after settling in quieting zones. Sediments which can form as a function of the proportioned quantity of the composition or combination substance by deposition of very fine particles of the above-mentioned combination crystals are easily removable mechanically in a known manner. In this connection, for tubular heat exchangers whose tubes are traversed by water, an object of the invention is the following method. On the one hand, in a known manner, elastic purification balls are charged in the water. The diameters of these balls are so adapted to the inside diameter of the tubes that the purification balls are pressed through the tubes interface-actively; on the other hand, the above-described composition or combination substance is added to the water. Surprisingly, this can be done in a reduced quantity as compared with operation without purification balls. "Interface-active" means that the purification balls also wipe off, as it were, the laminar boundary layers.

Within the scope of the stated specific measures of the invention with sulfurous acid esters of hydrolyzed di-and/or poly-saccharides, the latter bring about the complex formation of the hardness-former cations, sulfur occurring as central atom. The mode of action of these esters is synergistically reinforced by additions of carboxymethylated cellulose. Thus, it is possible to adapt their quantity to the concentrations present in the salt solutions to be evaporated, or respectively desired in the course of their thickening. The quantitative proportion of such additions is between about 0.5% and 10% by weight, referred to total weight of sulfurous acid esters. This is determined essentially by the ratio between Ca and Mg ion present in the water.

Another object of the invention is to provide a combination substance or composition for the practice of the described measures. This combination substance or composition consists, on the one hand, of (1) cation-complexing compounds comprising a mixture of sulfurous acid esters of hydrolyzed di- and/or poly-saccharides and carboxymethyl cellulose which act as cation-complexing compound, and, on the other hand, (2) with anionic substances comprising sulfonated fatty alcohols and/or fatty acids which act as anionic substances capable of salt formation with the complex-bound cations, the weight ratio of said cation-complexing compounds (mixture of sulfurous esters of hydrolyzed di- and/or polysaccharides and carboxy-methyl cellulose) to said anionic substances (sulfonated fatty alcohols and/or fatty acids) being 80:20 to 95:5, preferably 85:15 to 90:10.

The described new mechanism, according to the invention, will become more understandable by the numerical data of the following tables, which are prepared for $CaSO_4$ as organic salt.

TABLE 1

Dependence of the $CaSO_4$-solubility on the temperature and on the addition of combination substance in distilled water.

| Temperature °C | $[Ca \times SO_4]^{\frac{1}{2}}$ ppm Inhibitor addition | | | ppm |
|---|---|---|---|---|
| | 0 | 20 | 30 | 50 |
| 25 | 1120 | 1340 | 1400 | 1560 |
| 50 | 800 | 1000 | 1050 | 1210 |
| 80 | 500 | 680 | 720 | 870 |
| 100 | 310 | 460 | 500 | 650 |
| 120 | 200 | 350 | 385 | 420 |

TABLE 2

Concentration of $CaSO_4$ at continuous evaporation of sea water and 30 ppm combination substance addition temperature 120° to 140° C.

| Thickening | Ca ppm | $SO_4$ ppm | $[Ca \times SO_4]^{\frac{1}{2}}$ ppm |
|---|---|---|---|
| 1:2 | 870 | 3740 | 1803 |
| 1:2.02 | 880 | 3720 | 1806 |
| 1:2.85 | 1250 | 5340 | 2586 |
| 1:2.88 | 1230 | 5310 | 2559 |
| 1:2.88 | 1110 | 4800 | 2300 |
| 1:4.0 | 1020 | 5900 | 2472 |

The adjustment of a maximum concentration of Ca ion, calculated as $CaSO_4$, by intended precipitation of the hardness formers in harmless form is readily recognizable. The adjusted concentration maximum lies clearly above the normal saturation limit for $CaSO_4$ in sea water, as is evident from the following Table 3.

TABLE 3

Dependence of the solubility of $CaSO_4$ in sea water on time at 120° C and 30 ppm combination substance addition.

| Time hrs. | $[Ca \times SO_4]^{\frac{1}{2}}$ ppm Additive | | ppm |
|---|---|---|---|
| | 0 | 30 | 50 |
| 2 | 1829 | 1806 | 1860 |
| 3 | 2011 | 2586 | 2700 |
| 5 | 1900 | 2559 | 2680 |
| 6 | 1750 | 2300 | 2450 |
| 8 | 1600 | 2472 | 2650 |

In the following, the invention will be described with reference to an example.

EXAMPLE

A mixture of 70 parts cane sugar and 30 parts corn starch is treated, with addition of sodium carbonate, at a pressure of 3–10 kg/cm² and a temperature of 120°–160° C in the autoclave with dry 100% sulfur dioxide for three to four hours. The water formed during the esterification of the saccharides is absorbed by the starch with hydrolysis. The esterification is continued until a molar ratio of $C_6H_{12}O_6 : SO_2$ of at least 1:2 is reached. After cooling, the reaction product is taken up with water without decomposition and is purified from excess inorganic salts.

At the same time, in a second autoclave, a mixture of 80 parts bee's wax and 20 parts fatty alcohols of the type $C_{10} - C_{18}$ is treated at a temperature of 160° – 180° C with dry 100% $SO_2$ at a pressure of 8 – 12 kg/cm². The reaction is completed when the mixture has reached a content of combined sulfur dioxide of 40%.

The two reaction products are mixed together at elevated temperature and according to the purpose of use mixed with 0.5 – 10% carboxymethyl cellulose of molecular weight 20 – 30,000 to form a viscous gel of the combination substance according to the invention.

A sea water sample having the following composition was treated with the above obtained combination substance. The sea water had the following composition:

| Sea Water Analysis | |
|---|---|
| Ion | ppm |
| $Ca^{++}$ | 395 |
| $Mg^{++}$ | 958 |
| $SO_4^{++}$ | 1920 |
| $Cl^-$ | 14800 |
| $Na^+$ | 10750 |
| $K^+$ | 380 |
| $HCO_3^-$ | 120 |
| Carbonate hardness as $CaCO_3$ | 161 |
| Total hardness as $CaCO_3$ | 5080 |
| Total alkalinity as $CaCO_3$ | 161 |

At an evaporation of 1:2.2 this water already separates out acicularly crystallizing gypsum depositions. It was admixed with 10–50 mg/l, preferably 20–30 mg/l of the combination substance. At an evaporation of 1:4, corresponding to a calcium ion concentration of 1600 mg/l, flaky precipitates of small crystalline agglomerates form.

The seawater of the above composition is heated to a temperature of 120° C in a tubular heat exchanger and evaporated. Already at a thickening of 1:2.15, furry gypsum precipitates of clearly acicular structure, adhering to the tube walls, are formed. The addition of 20 mg/l of the combination substance permits instead the evaporation to 1:4 without formation of heat-insulating depositions on the tube walls.

What is claimed is:

1. A composition for use as an additive to water containing dissolved inorganic salts, in an amount of additive of 10 to 60 mg per liter, for preventing formation of deposits on hot metal surfaces, including surfaces of tube heat exchangers, said composition consisting essentially of:
    (A) sulfurous acid esters of hydrolyzed cane sugar and corn starch having a mole ratio of $C_6H_{12}O_6$ : $SO_2$ of at least 1 : 2,
    (B) carboxymethylcellulose having a molecular weight of between 20 and 30,000, and
    (C) sulfonated fatty alcohols of the type $C_{10}$ to $C_{18}$ and/or sulfonated beeswax having fatty acids with about 40% of combined $SO_2$, with the amount of (B) being 0.5 to 10% by weight relative to the amount of (A) and the weight ratio of (A) plus (B) to (C) being between 80 : 20 and 95 : 5.

2. Composition according to claim 1, consisting essentially of:
    (A) sulfurous acid esters of hydrolyzed cane sugar and hydrolyzed Indian corn starch, having a weight ratio of cane sugar to Indian corn starch of 7 : 3 and a mole ratio $C_6H_{12}O_6$ : $SO_2$ of at least 1 : 2,
    (B) carboxymethylcellulose having a molecular weight of between 20 and 30,000, and
    (C) sulfonated fatty alcohols of the type $C_{10}$ – $C_{18}$ and sulfonated beeswax having a weight ratio of fatty alcohols to beeswax of 1 : 4 and having about 40% of combined $SO_2$,
with the amount of (B) being 0.5 to 10% by weight relative to the amount of (A) and the weight ratio of (A) plus (B) to (C) being between 80 : 20 and 25 : 2.

3. Composition according to claim 1, wherein the composition is adapted to be added to the water in an amount to 20 to 30 milligrams per liter.

4. Composition according to claim 1, wherein the composition with the weight ratio of (A) plus (B) to (C) is between 85 : 15 and 90 : 10.

* * * * *